July 20, 1965     W. H. PARKER     3,195,240
DEPTH AND RADIUS GAUGE
Filed Oct. 9, 1961
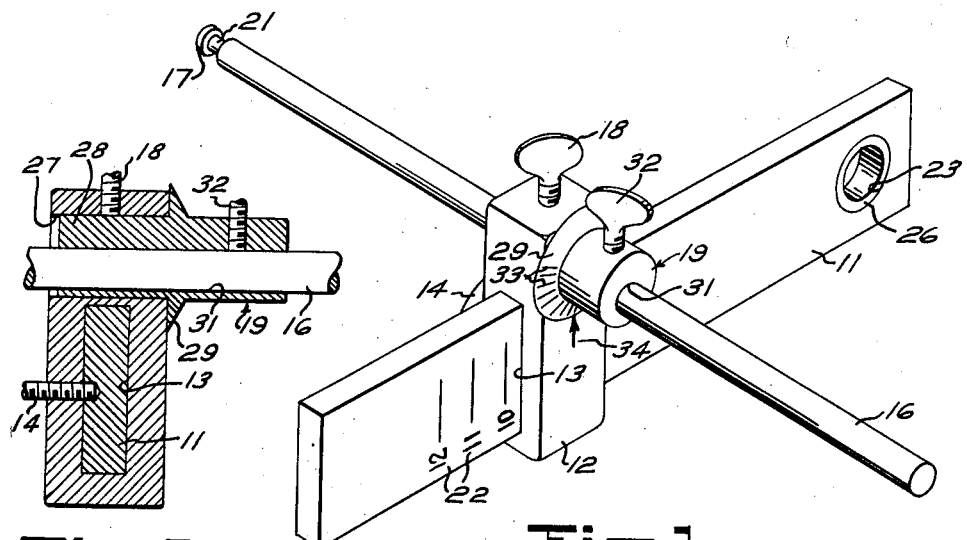
INVENTOR.
WARREN H. PARKER
BY
ATTORNEYS

United States Patent Office 3,195,240
Patented July 20, 1965

3,195,240
DEPTH AND RADIUS GAUGE
Warren H. Parker, Oakland, Calif., assignor of one-third to Charles Bork, Oakland, Calif., and of one-third to Norris O. Knutson, Danville, Calif.
Filed Oct. 9, 1961, Ser. No. 143,913
1 Claim. (Cl. 33—180)

This invention relates to gauges for use in connection with the repair and installation of automotive brakes, and is particularly directed to such a device which enables both depth and radius measurements to be made on various components of a brake assembly; and this application is a continuation-in-part of my prior copending application for U.S. Letters Patent, Serial No. 58,676, and hereby incorporates by reference pertinent subject matter disclosed therein. Briefly, said copending application discloses a device primarily for use in gauging the depths of various components of a brake assembly relative to a reference plane particularly the backing plate or dust shield and brake shoe mounting means of the assembly. The device generally comprises an arm which is adapted for connection to an axle spindle and which carries a yoke. A gauging member is mounted for translation relative to the yoke in right angular relation to the arm. A stop collar is mounted for translation axially of the gauging member and is releasably lockable thereon, such collar being abutable with the yoke. Thus, the arm may be connected to an axle spindle to extend radially therefrom and establish a reference plane perpendicular to the spindle. The stop collar may be locked at various axial positions along the gauging member and abutted with the yoke, the end of the gauging member thereby defining corresponding planes perpendicular to the spindle axis having varied depths relative to the reference plane. The gauging member may hence be contacted with the brake assembly backing plate or dust shield at a plurality of points thereof to determine its perpendicularity relative to the spindle axis. Similarly, the brake shoe mounting spider of certain type brakes may be checked for proper perpendicular form. Any of these elements observed to depart from the perpendicular can then be trued with the gauge providing the reference check. Also, gauge elements of predetermined thicknesses may be readily mounted on the gauging member between the collar and yoke to facilitate checking of the axial spacing relative to the spindle between the various elements of the brake assembly to insure that the spacing is proper to receive brake shoes. Thus the gauge of my prior application provides a ready indication of the proper parallelism and spacing of elements of a brake assembly to receive the brake shoes.

Aside from the foregoing depth measurements or checks of elements of a brake assembly, various radial measurements and checks of brake assembly elements are also required in the proper setting and adjustment of brake shoes in the assembly. It is frequently desirable, for example, to check the backing plate, brake drum, and linings for circular trueism. Likewise checks of the radial clearance between the linings and drum and of the lining thickness, drum diameter, and the like are of considerable importance in the setting and adjustment of brakes. I have found that the depth gauge of my prior application may be readily adapted to facilitate these radial measurements while retaining its depth gauging capabilities whereby a single gauge is provided for accomplishing virtually all of the measurements and checks requisite to the setting and adjustment of brakes.

It is, therefore, an object of the present invention to provide a combination depth and radius gauge for use in the adjustment and setting of brakes.

Another object of the invention is the provision of a gauge of the class described which is provided with a micrometer adjustment for very precise radial measurements.

It is still another object of the invention to provide a gauge of the class described which has several sets of radial calibrations to accommodate different types of axles as encountered with automobiles of varied makes.

Yet another object of the invention is the provision of a device of the above described type wherein the means for selectively securing the various elements of the gauge together are arranged to prevent wobbling of the gauge to the end of optimum accuracy of measurements.

It is still another object of the invention to provide a depth and radius gauge of extremely simple and economical construction.

A further object of the invention is to provide a gauge of the class described which is adapted for attachment to axles of varied sizes and types in a simplified manner.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

FIGURE 1 is a perspective view of the depth and radius gauge of the present invention.

FIGURE 2 is an enlarged front elevational view of the gauge as shown in FIGURE 1.

FIGURE 3 is a vertical cross sectional view taken on the line 3—3 of FIGURE 2.

FIGURE 4 is a side elevational view of the gauge as utilized with a brake assembly and illustrating particularly the radial gauging of the rim of the backing plate.

Referring now to the drawing, the gauge of the present invention will be seen to include a radial arm 11, preferably of rectangular cross section, which is adapted for substantially end attachment to any axle spindle in present use and in such a manner that the arm may be rotated about the axis of the spindle in a plane perpendicular thereto. The arm carries a yoke 12 which is slidable axially thereof and hence radially of a spindle to which the arm is attached. The yoke is preferably in the form of a rectangular block having a rectangular slot 13 parallel to opposite side faces thereof for receiving the arm 11 in sliding relation. In addition, provision is made to set or lock the yoke at any position along the arm and this may be accomplished by a set screw 14 extending through the block in threadable engagement therewith and intersecting the slot 13. Upon sliding the yoke block to any desired position along the arm, the block may hence be locked in position by tightening the set screw 14.

As a further element of the gauge there is provided a gauging member 16 which extends through the yoke block 12 and is selectively slidable relative thereto along an axis in right angular relation to slot 13 and therefore arm 11. The member 16 is thus disposed parallel to the axis of a spindle to which the arm 11 is attached and the probe end 17 of the gauging member describes a plane perpendicular to the spindle axis at a distance from a diametric reference plane defined by arm 11 determined by the axial position of the gauging member in the yoke. In order that the gauging member may be selectively locked at various axial positions of translation through the yoke, means such as a set screw 18 is carried by the yoke and may be tightened against the gauging member to lock same at any desired position.

In addition, the gauging member carries a stop collar 19 at its opposite end from probe end 17. Such probe end 17 is preferably provided with a concentric groove or recess 21 having the dimensions and for the purpose set forth in my copending application referenced hereinbefore. Additionally, several depth gauging spacer elements (not shown), having thicknesses in accordance with the considerations advanced in said copending application, may be provided for selective concentric disposition relative to gauging member 16 intermediate the collar and yoke.

It will be thus appreciated that the gauge as described thus far is generally similar to that disclosed in the previously referenced copending application and may be utilized to gauge depths of brake assembly backing plates etc., in accordance with the methods and for the purposes advanced therein. It is of importance to note that the gauge as modified in accordance with the present invention may also be utilized to gauge and measure radii, e.g., radii of the backing plates to determine the circular trueness thereof.

To the foregoing ends, the gauge of the present invention is provided with calibrations on the arm 11 as indicated at 22. Such calibrations represent distances along the arm from the center of a bore 23 at one end thereof which facilitates connection of the arm to an axle spindle. When the yoke 12 is disposed with a side edge flush with one of the calibrations, the gauging member 16 is thus at the radial distance from bore 23 indicated by the calibration. When the arm is secured at bore 23 to an axle spindle, radial distances of various brake elements may thus be readily gauged by contacting the elements with the probe end 17 of the gauging member 16. To assist in providing a wobble free securance of the yoke to the arm such that accuracy is not impaired, a plurality of indentations 24 are spaced longitudinally along the arm for engagement by the tip of set screw 14 when the side edge of the yoke is at one of the calibrations 22.

It will be appreciated that spindles of varied diameters may be encountered. In order that the gauge may be employed with all of these spindles, a plurality of bushings 26 having varied inner diameters may be advantageously provided for engagement in the bore 23. More particularly, the bushings 26 all have an outer diameter comparable to the diameter of bore 23 such that they may be fitted therein. The varied inner diameters are selected to correspond to the outer diameters of the spindles which might be encountered. Moreover, the inner diameter of one bushing is selected to correspond to the lug bolts of a flanged axle such that when such an axle is encountered the arm 11 may be attached to the flange by means of one of the lug bolts. It will be appreciated, however, that when the arm is attached to the flange the calibrations 22 are no longer of use in indicating radial distances from the axial center of a brake assembly. Accordingly, one or more additional calibration scales (not shown) may be provided on the arm which are compensated for the radial distance from the center of a flanged axle to the lug bolt circle thereof.

Of course the calibrations 22 and other calibration scales only provide a coarse indication of radial distances from bore 23. In order that radial distances may be determined with a substantial degree of precision, fine calibration means are also provided in the gauge of the present invention. Preferably such means are arranged to mount the gauging member 16 for eccentric rotation within a bore 27 in the yoke for receiving the gauging member. Thus upon rotating the gauging member on the eccentric, the member is radially displaced from the center of bore 27 in minute amounts, thus facilitating a fine variation in the radial distance of the gauging member from the spindle bore 23. Preferred structure for the accomplishment of the foregoing includes the collar 19. Such collar is best provided to include an elongated bushing portion 28 with a flange portion 29 outwardly flared therefrom. The bushing portion is arranged to slidably and rotatably engage the bore 27 as well as to receive any of the depth gauging elements mentioned hereinbefore concentrically thereon. The collar is additionally provided with an eccentric bore 31 therethrough for slidably receiving the gauging member 16 and a set screw 32 for selectively locking the collar upon the member 16. Thus with the collar locked upon the member 16 and the set screw 18, which intersects bore 27, loosened the collar may be rotated in the bore to effect fine radial displacements of the gauging member. The face of flange portion 29 of the collar may be calibrated, as indicated at 33, in terms of the fine radial displacements and an indexing mark 34 provided on the yoke as a reference point for the calibrations 33. The yoke may hence be set at one of the coarse calibrations 22 and the collar rotated to a position wherein the desired fine calibration is opposite the indexing mark. The set screw 18 may be then tightened to set the gauging member 16 at the radial distance indicated by the calibrations.

In the use of the gauge for radial gauging purposes, the arm 11 is secured at bore 23 to, for example, an axial spindle 36 as indicated in FIGURE 4, a suitable one of the bushings 26 and a nut 37 threadably engaging the threaded end of the spindle being employed for this purpose. If for example it is desired to determine the circular trueness of the rim 38 of the brake assembly backing plate 39, the yoke 12 is translated radially along arm 11 and the collar 19 is rotated within bore 23 to positions wherein the probe end 17 of gauging member 16 contacts the inner periphery of rim 38 as indicated in full line in the figure. The set screws 14 and 18 are then tightened to lock the gauging member at this radial position. The arm may then be rotated about the spindle and departures from contact of probe end 17 with the rim 38 noted as an indication of out of trueness. For example, out of trueness may be observed as indicated by the phantom line position of the gauge in the figure, the probe end 17 of the gauging member being inwardly displaced from the rim. If desired the amount of out of trueness may be readily and precisely determined by loosening set screw 18, rotating the collar 19 until the probe end of gauging member contacts the rim, and observing the departure in the calibrations 33 from the original setting. Other radial gauging operations and measurements are readily accomplished in a similar manner.

What is claimed is:

A combined depth and radius gauge for the braking plate or the like of a wheel brake assembly, comprising an elongated arm having a bore adapted to receive an axle spindle for rotation of the arm thereon, a yoke mounted on said arm for slidable movement longitudinally thereof and having a bore parallel to said first bore, a collar having a bushing portion journaled for rotation in said second bore, said collar having a bore parallel and eccentric to the bore in said yoke, an elongated gauging member slidably and rotatably mounted in said eccentric bore, said arm having calibrating markings thereon cooperating with a portion on said yoke for indicating distances between the first bore and the yoke, and said collar and yoke having coperating calibrating markings for indicating the rotation position of the collar in relation to the yoke, means on the collar for selectively retaining the gauge member against axial displacement in the bore thereof, and means for selectively retaining the collar against rotation in the yoke.

References Cited by the Examiner

UNITED STATES PATENTS

| | | | |
|---|---|---|---|
| 2,005,870 | 6/35 | Miller et al. | 33—180 |
| 2,087,497 | 7/37 | Blackman | 33—180 |
| 2,972,192 | 2/61 | Atzberger | 33—180 |

ISAAC LISANN, *Primary Examiner.*

ROBERT EVANS, *Examiner.*